US012804420B2

(12) United States Patent
Farooq et al.

(10) Patent No.: US 12,804,420 B2
(45) Date of Patent: Nov. 17, 2026

(54) AUTOMATED TRAINING OF FAILURE DIAGNOSIS MODELS FOR APPLICATION IN SELF-ORGANIZING NETWORKS

(71) Applicant: Telefonaktiebolaget LM Ericsson (publ), Stockholm (SE)

(72) Inventors: Hasan Farooq, Santa Clara, CA (US); Maxime Bouton, Stockholm (SE); Julien Forgeat, San Jose, CA (US); Meral Shirazipour, Santa Clara, CA (US); Shruti Bothe, Santa Clara, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 401 days.

(21) Appl. No.: 18/552,169

(22) PCT Filed: Mar. 30, 2021

(86) PCT No.: PCT/IB2021/052662
§ 371 (c)(1),
(2) Date: Sep. 22, 2023

(87) PCT Pub. No.: WO2022/208133
PCT Pub. Date: Oct. 6, 2022

(65) Prior Publication Data

US 2024/0172001 A1 May 23, 2024

(51) Int. Cl.
*H04W 48/06* (2009.01)
*H04L 41/14* (2022.01)
(Continued)

(52) U.S. Cl.
CPC .......... *H04W 24/02* (2013.01); *H04L 41/145* (2013.01); *H04W 24/04* (2013.01)

(58) Field of Classification Search
CPC ........... G06N 3/08; G06N 3/04; G06N 20/00; G06N 3/045; G06N 5/02; G06N 3/084;
(Continued)

(56) References Cited

U.S. PATENT DOCUMENTS 9,843,486 B2 12/2017 Feller et al.
10,289,973 B2 5/2019 Feller et al.
(Continued)

FOREIGN PATENT DOCUMENTS

WO 2020/048594 A1 3/2020

OTHER PUBLICATIONS

3GPP TS 32.111-1 V13.0.0, "3rd Generation Partnership Project; Technical Specification Group Services and System Aspects; Telecommunication management; Fault Management; Part 1: 3G fault management requirements (Release 13)," Jan. 2016, 23 pages, 3GPP Organizational Partners.
(Continued)

*Primary Examiner* — Quan M Hua
(74) *Attorney, Agent, or Firm* — Nicholson De Vos Webster & Elliott LLP

(57) ABSTRACT

A method and system for a training manager for generating diagnosis models for mobile networks. The method including selecting automatically a set of parameters for an action to be simulated in a simulated network where the simulated network replicates a target network for a diagnosis model, executing a simulation of an operation of a network based on the set of parameters of the action to generate an output of the simulation including a set of network performance metrics, transforming output of the simulation into training data for the diagnosis model, training the diagnosis model with the training data, and outputting the diagnosis model for the target network, in response to the diagnosis model meeting a designated quality threshold.

20 Claims, 9 Drawing Sheets

(51) Int. Cl.
*H04W 24/02* (2009.01)
*H04W 24/04* (2009.01)

(58) Field of Classification Search
CPC .......... G06N 20/20; G06N 3/082; G06N 7/00; G06N 99/00; G06N 3/00; G06N 3/063; G06N 5/04; G06N 20/10; G06N 3/008; G06N 3/02; G06N 3/096; G06N 5/045; G06V 10/82; G06V 10/778; G06V 10/74; G06V 10/77; G06V 10/774; G06V 10/94; G06V 20/52
See application file for complete search history.

(56) References Cited

U.S. PATENT DOCUMENTS

| | | | | |
|---|---|---|---|---|
| 2012/0039176 | A1* | 2/2012 | Eshan | H04L 1/0002 370/237 |
| 2016/0205697 | A1* | 7/2016 | Tan | H04W 24/02 370/329 |
| 2018/0268292 | A1* | 9/2018 | Choi | G06V 10/70 |
| 2018/0322388 | A1* | 11/2018 | O'Shea | G06N 3/08 |
| 2021/0219384 | A1* | 7/2021 | Liao | H04W 24/02 |

OTHER PUBLICATIONS

Ahmad Asghar et al., "Outage Detection for Millimeter Wave Ultra-Dense HetNets in High Fading Environments," 2019, pp. 1-6, 2019 IEEE International Conference on Communications (ICC).

Ahmad Asghar et al., "Self-Healing in Emerging Cellular Networks: Review, Challenges, and Research Directions," 2018, pp. 1682-1709, IEEE Communications Surveys & Tutorials, vol. 20, No. 3, Third Quarter 2018.

Ahmed Zoha et al., "Data-Driven Analytics for Automated Cell Outage Detection in Self-Organizing Networks," 2015, pp. 203-210, 2015 11th International Conference on the Design of Reliable Communication Networks (DRCN), IEEE.

Gabriel Dulac-Arnold et al., "Deep Reinforcement Learning in Large Discrete Action Spaces," Apr. 4, 2016, 11 pages, arXiv:1512.07679v2, downloaded from https://arxiv.org/abs/1512.07679.

Jamale Benitez Porch et al., "Machine Learning Approach for Automatic Fault Detection and Diagnosis in Cellular Networks," May 2020, 5 pages, BlackSeaCom, IEEE.

Jason Gauci et al., "Horizon: Facebook's Open Source Applied Reinforcement Learning Platform," 2018, 7 pages, Facebook Research, downloaded from https://research.fb.com/publications/horizon-facebooks-open-source-applied-reinforcement-learning-platform/.

Jiechao Xiong et al., "Parametrized Deep Q-Networks Learning: Reinforcement Learning with Discrete-Continuous Hybrid Action Space," Oct. 10, 2018, 18 pages, arXiv:1810.06394v1, downloaded from https://arxiv.org/pdf/1810.06394.pdf.

Marc-André Zöller et al., "Benchmark and Survey of Automated Machine Learning Frameworks," Jan. 8, 2020, 64 pages, arXiv:1904.12054v2.

Paulo Valente Klaine et al., "A Survey of Machine Learning Techniques Applied to Self-Organizing Cellular Networks," 2017, pp. 2392-2431, IEEE Communications Surveys & Tutorials, vol. 19, No. 4, Fourth Quarter 2017.

Shruti Bothe et al., "Neuromorphic AI Empowered Root Cause Analysis of Faults in Emerging Networks," May 2020, 6 pages, BlackSeaCom, IEEE.

Usama Masood et al., "Deep Learning Based Detection of Sleeping Cells in Next Generation Cellular Networks," 2018, pp. 206-212, IEEE.

Yang Fan et al., "Learning to Teach," May 9, 2018, 16 pages, arXiv:1805.03643v1, ICLR 2018.

Yuanlong Li et al., "Intelligent Trainer for Model-Based Deep Reinforcement Learning," Jun. 5, 2019, 13 pages, arXiv:1805.09496v6.

* cited by examiner

AUTOMATED TRAINING OF FAILURE DIAGNOSIS MODELS FOR APPLICATION IN SELF-ORGANIZING NETWORKS

CROSS-REFERENCE TO RELATED APPLICATIONS

This application is a National stage of International Application No. PCT/IB2021/052662, filed Mar. 30, 2021, which is hereby incorporated by reference.

TECHNICAL FIELD

Embodiments of the invention relate to the field of machine learning; and more specifically, to an automated process for training failure diagnosis models for self-organizing networks.

BACKGROUND ART

Mobile cellular telecommunication networks, referred to herein as "mobile networks," are large networks encompassing a large number of computing devices to enable mobile devices that connect wirelessly to the mobile network to communicate with other computing devices including both other mobile devices and other types of computing devices. The mobile devices, e.g., user equipment (UE) such as mobile phones, tablets, laptops, and similar devices, may frequently travel and shift connection points with the mobile network in a manner that maintains continuous connections for the applications of the mobile devices. Typically, the mobile devices connect to the mobile network via radio access network (RAN) base stations, which provide connectivity to any number of mobile devices for a local area or 'cell.' Managing and configuring the mobile network including the cells of the mobile network is an administrative challenge as each cell can have different geographic and technological characteristics.

Machine learning is an area of artificial intelligence (AI) in the field of computer science that applies algorithms and statistical models that are not task specific to perform specific tasks without the use of instructions that are specific to the task to be performed. The algorithms and statistical models can employ pattern recognition, inference, and similar techniques to perform a task rather than specific instructions for the task. Many machine learning algorithms build a model based on training data. Training data can be a set of sample or starting data with known properties such as correlation with a task outcome. The training data are input into the algorithm and model to 'train' the AI to perform a task. Machine learning algorithms can be applied to tasks or applications, such as email management or image recognition, where it is difficult or infeasible to develop a conventional algorithm to effectively perform the task.

SUMMARY

In one embodiment, a method and system for a training manager for generating diagnosis models for mobile networks. The method including selecting automatically a set of parameters for an action to be simulated in a simulated network where the simulated network replicates a target network for a diagnosis model, executing a simulation an operation of a network based on the set of parameters of the action to generate an output of the simulation including a set of network performance metrics, transforming output of the simulation into training data for the diagnosis model, training the diagnosis model with the training data, and outputting the diagnosis model for the target network, in response to the diagnosis model meeting a designated quality threshold.

In one embodiment, a machine-readable medium includes computer program code which when executed by a computer carries out a set of operations for a training manager for generating diagnosis models for mobile networks, where the set of operations includes selecting automatically a set of parameters for an action to be simulated in a simulated network where the simulated network replicates a target network for a diagnosis model, executing a simulation an operation of a network based on the set of parameters of the action to generate an output of the simulation including a set of network performance metrics, transforming output of the simulation into training data for the diagnosis model, training the diagnosis model with the training data, and outputting the diagnosis model for the target network, in response to the diagnosis model meeting a designated quality threshold.

In a further embodiment, a system of one or more electronic devices, includes a non-transitory machine-readable storage medium having stored therein a training manager, and a processor coupled to the non-transitory machine-readable storage medium. The processor is configured to execute the training manager, the training manager to select automatically a set of parameters for an action to be simulated in a simulated network where the simulated network replicates a target network for a diagnosis model, execute a simulation an operation of a network based on the set of parameters of the action to generate an output of the simulation including a set of network performance metrics, transform output of the simulation into training data for the diagnosis model, train the diagnosis model with the training data, and output the diagnosis model for the target network, in response to the diagnosis model meeting a designated quality threshold.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
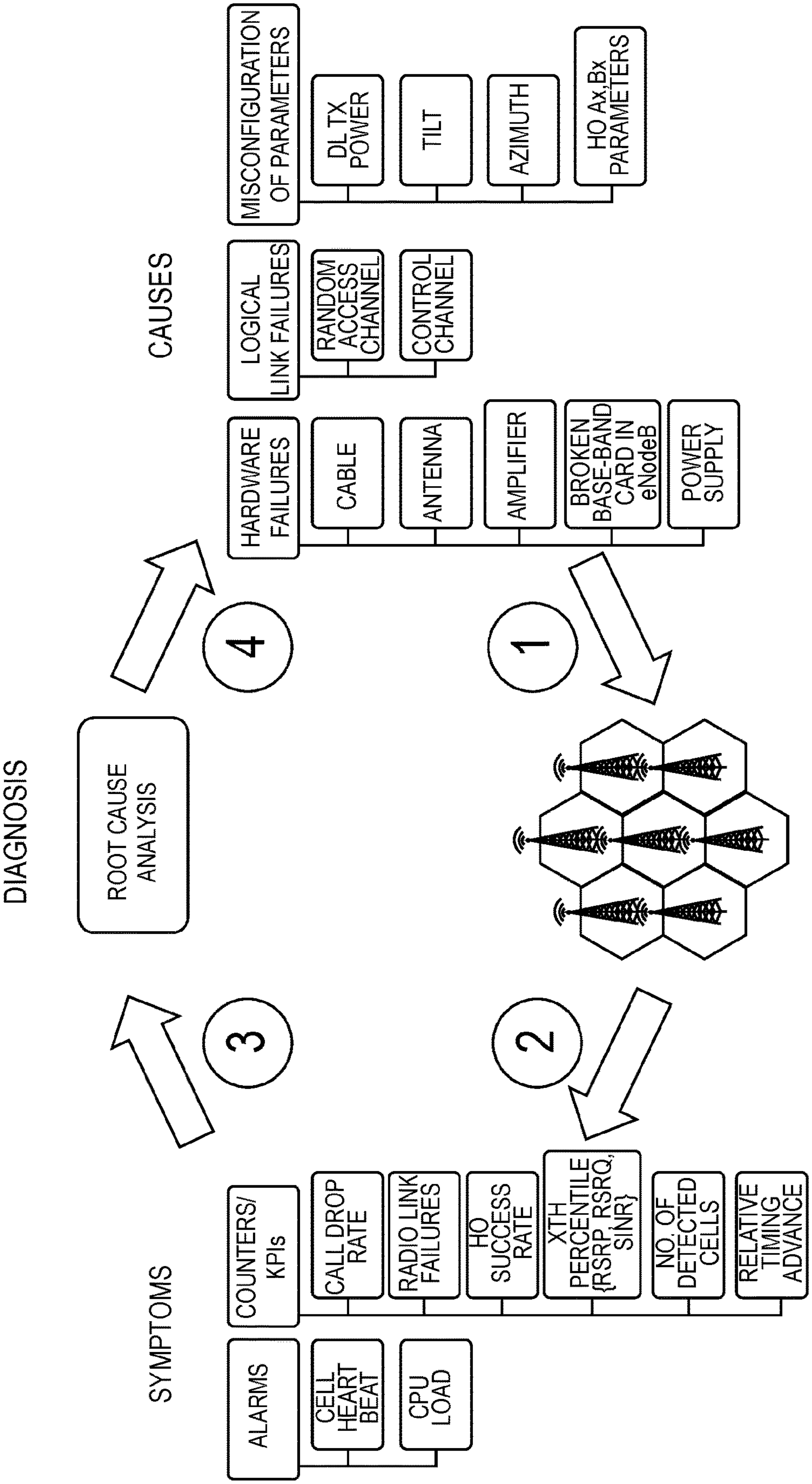
FIG. 1 is a diagram of an example embodiment of diagnosis for mobile networks.

The following description describes methods and apparatus for a dynamic and automated process and system for training diagnosis machine learning models by simulating network using different parameters, automatically generating training data from the simulation, training a diagnosis model using the training data and evaluating the training and training data in a recurring process until the diagnosis model and/or the training data meet a designated quality threshold. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Mobile networks (i.e., networks that provide access to mobile devices, referred to as user equipment (UEs), which include cellular networks) are inherently subjected to outages (e.g., partial/complete cell outages) caused by either base station hardware and/or software malfunctions, vendor incompatibility or misconfiguration of several hundred base station/cell/core parameters during routine network operation. Future mobile networks are likely to be susceptible to even higher outages rates since the rate of outages is proportional to factors such as cell density, complexity of hardware and software that constitute the radio access network and core network, and similar factors. These factors that cause outages have been consistently rising from first generation (1G) to $5^{th}$ generation (5G) networks. Faults can appear in several functional areas of a complex mobile network. For example, one critical domain when managing faults in the mobile network is the radio access network (RAN).

In current mobile networks, drive tests or fault alarms accompanied with expert knowledge are employed for detecting and diagnosing the root cause of the performance degradation in the mobile network. The problem with these approaches is that there is a huge number of network elements (e.g. base stations) in a mobile network and each of these network components can go into a state of degradation. Such degradations manifest themselves in variations of several key performance indicators (KPIs) and alarms which are not easily mapped to a specific cause. Considerable manual workload is required to manage the troubleshooting and proper configuration of the mobile network, because engineers need to constantly analyze performance data. 'Manual work,' in this context, often also means that the degradation time period mentioned (i.e., the amount of time that network degradation persists) can be significant.

Existing approaches to outage management are inadequate, because they are error-prone and highly inefficient for today's network operators, making them unfeasible for sustaining future cellular networks marked by ultra-dense cell deployment and mounting operational complexity. If no mitigating or management improvement measures are developed, then outage management in mobile networks will be one of the primary challenges for the operation of future mobile networks and associated technologies, such as 5G based mobile networks and beyond.

The embodiments utilize a concept of a self-healing networks to identify performance issues in a mobile network using metrics such as KPI degradations and network component or cell outages. In addition, the goal of a self-healing network is to diagnose the root cause of outages in the mobile network and perform compensation or corrective steps automatically to restore the full operation of the mobile network without requiring significant manual work.

A self-healing network can implement processes for fault detection, compensation, and diagnosis. The embodiments provide a process for improving diagnosis models for use in the diagnostics of a self-healing network. The aim of the diagnosis is to find the root cause of a detected fault given the symptoms observed. FIG. 1 is a diagram of an example embodiment of diagnosis for mobile networks. In particular, the diagnosis can be an automated diagnosis as part of a self-healing network. Diagnosis often requires building a knowledge-base of all possible faults scenarios accompanied by expert knowledge for labelling root causes of the faults. These scenarios include outages caused due to failure of physical or soft components of the network entities, rendering them non-functional and causing complete or full outage, or significant service degradations leading to partial outage that may not necessarily generate any system level alarms. Causes as illustrated can include hardware failures, logical link failures, misconfiguration and similar causes. Hardware failures can include failures in cables, antenna, amplifiers, base-band cards in eNodeBs, power supplies, and similar components. Logical link failures can include random access channel failures, control channel failures, and similar failures. Misconfigurations can include downlink transmission power, tilt, azimuth, HO (handovers), Ax, Bx, and similar parameters.

The root causes are detected by way of symptoms, which can be in the form of alarms, counters, KPIs, and similar metrics. Alarms can be monitors for faults associated with hardware failure, software failure, functionality failure or any other faults that cause a network component to stop performing its routine operations. Alarms can include cell heart beats, CPU loads, and similar mechanisms. Counter and KPIs can include call drop rate, radio link failures, HO success rate, an xth percentile reference signal received power (RSRP), reference signal received quality (RSRQ), signal to noise ratio (SINR), number of detected cells, relative timing advance and similar values.

No standardized diagnostics exist for partial outages. This is because partial outages may not generate alarms, whereas the users in the problematic cells experience service degradation, which is termed as partial outage. Compared with full outage, partial outage is invisible to operators, which makes its detection/diagnosis more difficult. The network components suffering from partial outage can still provide services to their subscribers but cannot meet users' quality of service (QoS) requirements. Moreover, the same partial outage may be caused by two different sets of circumstances. In the past, outage diagnostics have remained in the domain of human experts who use their knowledge to identify complete/partial outage causes. It is very time consuming and is prone to human errors given the increasing complexity of the system. Therefore, relying on human expert knowledge for manual diagnosis cannot remain as the method of choice going forward towards ultra-dense networks.

The embodiments utilize data-driven automated diagnosis leveraging machine learning models for achieving timely and accurate diagnosis of the cause of the faults that are critical for both improving subscriber perceived experience and maintaining network reliability. Automated diagnosis can include machine learning models trained on historical labelled datasets that can be utilized to predict root causes of partial/complete outages in the network by analyzing current network KPIs. This solution operates on the idea of maintaining a training database that is used to generate an ML model mapping of anomaly patterns (i.e. a set of indicators showing anomaly) to fault root causes. However, the use of this approach can be challenging in practice since training the ML model would require constructing a database of every possible root cause resulting in an outage. To address this issue, the embodiments present methods for outage diagnosis that focus on how automated diagnostic models can be trained efficiently without creating artificial outages in the real network. Real network data-driven network simulators also known as Digital Twins are used to simulate approximate to actual network scenarios that are promising candidates and can be leveraged for training diagnosis models.

The embodiments overcome the limitations of the prior art. In the prior art, the operations to detect, diagnose and resolve issues were carried out by human experts. However, with diversifying cell types, increased complexity and growing cell density, this methodology is becoming less viable, both technically and financially. The embodiments utilize self-healing and self-organizing networks to provide automated fault diagnosis. The embodiments provide a solution that does not rely on labeled datasets from real-world networks. The scarcity of labeled datasets is a challenge for automated diagnosis. In real-world mobile communication networks, cell outage is a rare event compared with normal operations and partial outages caused by sleeping cells that mostly remain undetected by operators. Moreover, in cell outage scenarios, diagnostic steps for resolution of fault are often not logged in a systematic methodological manner. In addition to faults that have occurred in current legacy networks, diagnosis of full and partial outages in future 5G/6G networks deployment scenarios with millimeter wave cells, ultra massive multiple in multiple out (MIMO), device to device (D2D), and machine to machine (M2M) communication, and ultra-dense cell deployment must also be explored since they are an uncharted territory as yet.

The embodiments address these issues in the prior art by use of a design of an artificial intelligence (AI) teacher-student based method that learns, tabula rasa, by teaching itself from scratch how to master the wireless mobile network diagnosis by inculcating the ability to learn and diagnose each scenario afresh, unconstrained by the norms of human thinking resulting in a distinctive, unorthodox yet accurate and agile diagnosis. The embodiments provide an efficient automated training method for machine learning (ML)-based diagnosis models that offers a key step towards a completely automated self-healing system without requiring human expert assistance. The embodiments provide a process for reinforcement learning based teacher agent interacting with a conventional ML based diagnosis student model. The teacher agent decides what kind of fault training data to generate from a network simulator acting as the network's digital twin and leverages the feedback from the student model to optimize its own teaching strategies so as to achieve teacher-student co-evolution. In the end, the generated training dataset must be realistic and must train the ML based diagnosis model to perform well on real faults datasets while experienced teacher agent can then be utilized to efficiently train another ML diagnosis student model. The advantages of the embodiments enable coping with scarcity of labelled faults datasets and diagnostic logs in telecom networks, and the efficient training of ML based diagnosis models without human assistance.

Figure 2:
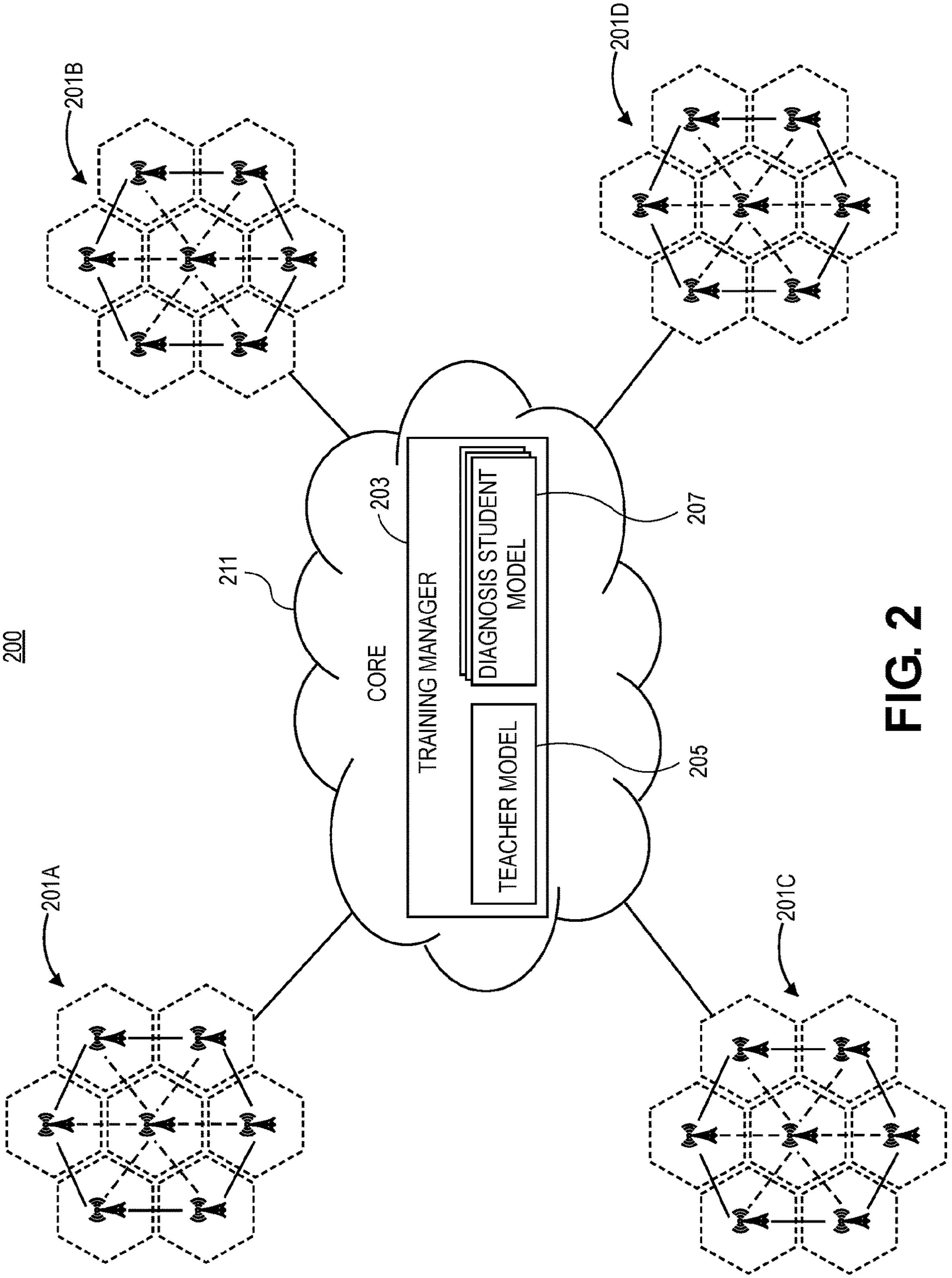
FIG. 2 is a diagram of one embodiment of a mobile network managed by a core network including a training manager.

FIG. 2 is a diagram of one embodiment of a mobile network in which a training manager can be deployed. The training manager 203 can implement the processes described herein including the execution of a teacher model 205 and a set of diagnosis student models 207. The training manager 203 can be executed in a core of a mobile network 200, or at any other appropriate network node(s) therein. The core 200 can be any number or set of computing devices including network components that enable cellular networks 201A-D to communicate with one another and other networks. The cellular networks 201A-D provide connectivity to any number of UEs that are wirelessly connected to the cellular networks 201A-D.

The training manager 203 includes a teacher model 205 that generates training data for and facilitates the training of a set of diagnosis student models 207, as described further herein. The set of diagnosis student models 207 can be any positive whole number of diagnosis models that are ML models trained to diagnose specific issues with the operation of a given cellular network 201A-D or the mobile network 200.

The embodiments provide the training manager 203 which further includes the teacher model 205 and the set of student models 207. The teacher model is a reinforcement learning agent which generates training data from a network simulator. A given student model 207 is a machine learning model that is trained using the generated simulated training data, to perform diagnosis classifications such as determining the cause of faults or performance degradations given a real network configuration and some KPIs. The embodiments provide a ML model training process that does not require a dataset that is pre-acquired. In this case, the kind of simulated data to generate is learnt by the teacher model such that a diagnosis model is efficiently trained on it and is able to perform well with real data.

Figure 3:
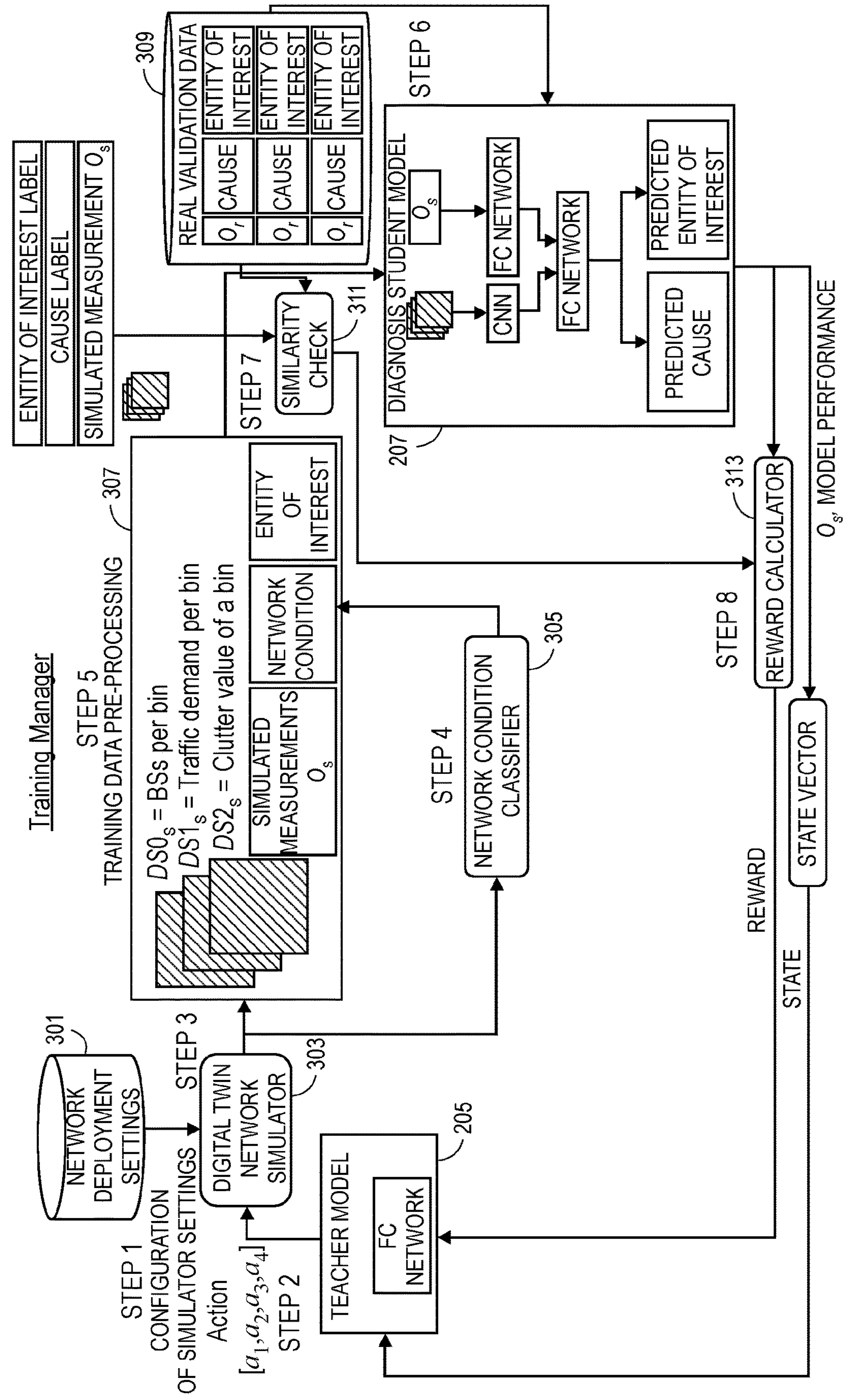
FIG. 3 is a diagram of one embodiment of a training manager for mobile networks.

FIG. 3 is a diagram of one embodiment of the process of the training manager. The process of the training manager is described with relation to a set of example steps in reference to associated components in FIG. 3. This organization of components and steps are provided by way of example and not limitation. One skilled in the art would understand that the steps described with relation to FIG. 3 can be differently organized consistent with the principles of the processes described with relation to the examples in FIG. 3.

The process can include a configuration of the network simulator 303 (Step 1). Based on the configuration and topology 301 of the actual network region that is being targeted, the network simulator 303 (referred to as a 'digital twin') is configured to replicate the targeted network. The topology and configuration settings 301 of the targeted network can consist of information like base station locations, antenna configurations of individual sectors including their tilt and azimuth angles, radio frequency (RF) antenna heights for individual base station sites, transmission power configurations for each site, spectrum allocation and frequency reuse plan, digital terrain maps, user demography, coverage and service maps for the deployed network configuration, and similar information. Configuration and network deployment settings 301 can be imported from the targeted network, retrieved from a configuration management system, or similarly obtained.

All configurable aspects of the simulator 303 are set to match the real network deployment. The embodiments can utilize any type of simulator that simulates the target network with any degree of complexity and accuracy. Depending on the capability of the simulator a different set of configurations variables can be set. The greater the accuracy of the simulator, the greater the quality of training data that is likely to be produced using the simulator. In some embodiments, the training manager 203 can facilitate the setup, import and execution of the network simulator 303.

The trainer manager 203 can similarly facilitate the selection of a network configuration action with a teacher model 205 (Step 2). The teacher model 205 determines an 'action,' which is a test case that includes any one or more of a set of component parameters referenced herein as $a_1$-$a_n$. The following parameters are provided by way of example and not limitations. Any set and combination of parameters can be utilized to form an 'action,' where the action is designed to test for target network performance degradation based on changes in the parameters that are linked to configuration aspects of the target network. In one example, a parameter $a_1$ determines which network component (e.g., base station, physical transport network, evolved packet core, etc.) to select for inducing performance degradation. The parameter $a_2$ determines which configuration parameter of the selected network entity (through $a_1$) is varied for inducing performance degradation. For example, network configuration parameters can be a particular base station's antenna parameter like downlink transmission power, beam parameters, handover hysteresis, radio resource scheduling parameters, and similar parameters. In this example, the parameter $a_3$ determines how much change or offset is done for the configuration parameter selected by $a_2$. In some embodiments, the range of $a_2$ can be normalized in range of (0-1), while in other embodiments different normalized ranges can be utilized. In the example, the parameter $a_4$ determines a traffic profile of the network, e.g., an index that identifies a known traffic pattern such as a morning, afternoon, or evening time traffic pattern as described by an associated traffic requirements profile or similar descriptive structure. In this example, the parameters $a_1$, $a_2$, $a_4$ are categorical variables and $a_3$ can be potentially continuous depending on the chosen parameter.

In one example case, the teacher model 205 and training manager 203 are designed to train a diagnosis student model 207 to learn to identify the cell individual offset (CIO) parameter misconfiguration in some base stations of a targeted network or in a generic network setting. The CIO is an attraction factor that is broadcasted by small cells to bias their ranking and attract users to camp on them when sharing spectrum with macro cells. In this way, power disparity in macro and small cells' transmission powers is avoided and more load can be transferred to them leading to load balancing. CIO, as a stand-alone solution, addresses the selection between different network layers in heterogeneous networks. However, this use of CIO can have a catastrophic effect on users' SINR since through artificial biasing, UEs are not necessarily connected to the strongest cell. As a consequence, SINR deteriorates with higher values of CIO. In this example, the $a_1$ that the teacher model 205 selects can be a small cell base station numbered 1. Then for $a_2$ the teacher model 205 selects the CIO parameter. For $a_3$ the teacher model 205 selects value 1 to make this interval the maximum possible value. For $a_4$ the teacher model selects an evening traffic scenario. With these selections, the teacher model 205 send the action vector [BS1, CIO, 1, evening_traffic_profile] as input to network simulator.

The embodiments scale the action space to be applicable to very large networks. The process can be scaled to the large-scale network by using a continuous space embedding for the large action space. Scaling can also be enabled by restricting the domain under consideration to specific network entities or fault types i.e., one teacher model can be used for macros only or for small cells only. Domains can be differentiated based on RAN or core network entities. The embodiments can use different teacher models for specific fault types e.g., antenna related issues, issues related to mobility related parameters, and similar fault types. This is analogous to specialists in medical domain where a specialist focuses on particular type of disease or condition and books/teachers specific to that disease or condition are utilized to train that specialist. Specific teacher models can be utilized in the same way to train sub-sets of diagnosis student models.

The training manager 203 further performs data pre-processing on the output of the network simulator 303 (Step 3). Based on action at =$[a_1, a_2, a_3, a_4]_t$ received from the teacher model 205, the network simulator 303 proceeds with the simulation and creates simulation scenario snapshot. The snapshot output of simulator 303 includes current network deployment settings as well as the simulated measurements (KPIs/counters) e.g., blocked call rate, dropped call rate, cell capacity, number of ping-pongs, HO drops, RSRP-RSRQ statistics, modulating and coding scheme (MCS) distribution, and similar metrics. These are sent to the network condition classifier 305 as well as the training data pre-processor 307.

The network condition classifier 305 is a ML model that is based on simulated measurements. The network condition classifier 305 classifies whether simulated network is experiencing degradation or not (Step 4). This component can be thought of as an automatic data labelling procedure for degradation/normal scenarios. The network condition classifier 305 can take the form of if-else rules based on thresholds that can be defined by network experts e.g., when the CIO parameter is much higher than the SINR and consequently throughput will be degraded. Based on detected degraded throughput, the network condition classifier will generate a 'cause label' indicating the network is in a degradation state and then set the cause label to be set, e.g., to $a_2$ (e.g., CIO) and entity of interest level to $a_1$ (e.g., BS1). Any method, process, or combination thereof can be used for implementation of the network condition classifier.

The training data pre-processor 307 takes the raw output of network simulator (e.g., the snapshot) and pre-preprocesses it for the student model. The deployment settings in the snapshot, such as base Station locations, traffic profile, and clutter classes are transformed into matrix form while counters and KPI features are transformed in a form of 1d feature vector $O_s$ of length (i×j) where i is number of cells and j is total number of measurements (M) considered e.g., $O_s$ can be shown below in Table I.

TABLE I

| Cell1_M1 | Cell1_M2 | . . . | Cell1_Mj | Cell2_M1 | . . . | Celli_Mj . . . |
|---|---|---|---|---|---|---|
| 0.8 | 0.5 | . . . | 0.3 | 0.5 | . . . | 0.7 |

Figure 5:
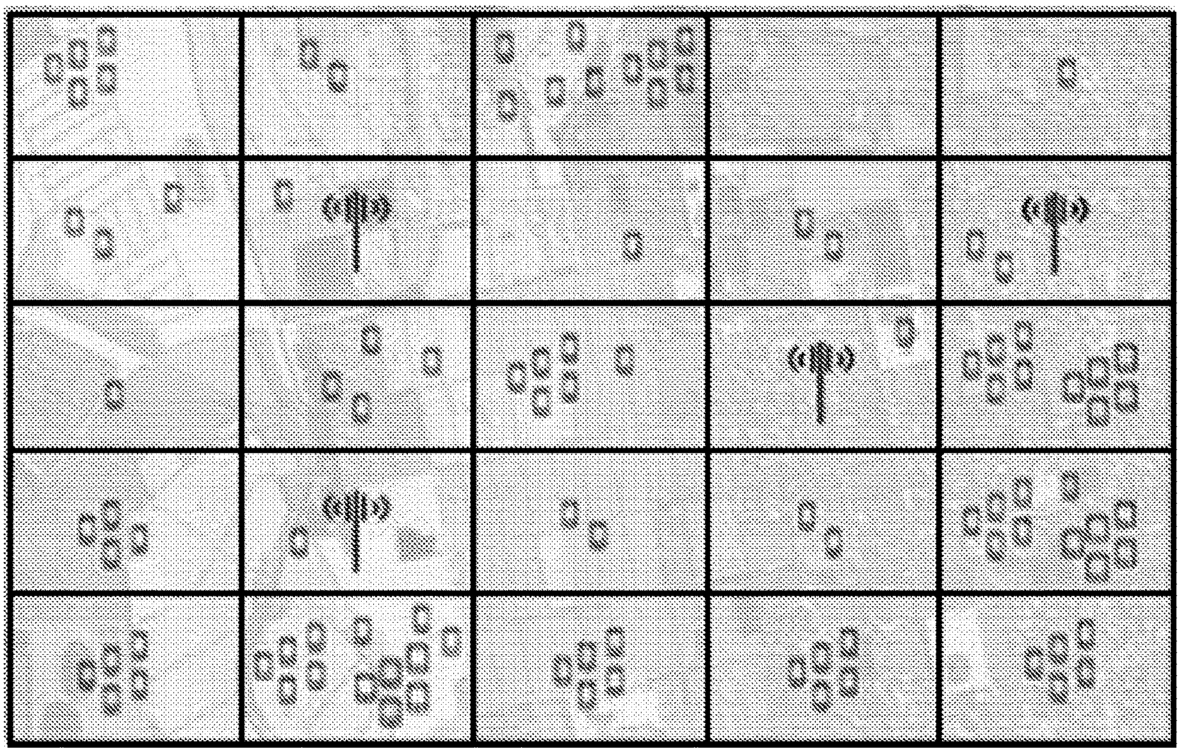
FIG. 5 is a diagram of one example embodiment of a deployment region of a cellular network.

Depending upon the input received from the network condition classifier, the data pre-processor 307 sets the value of the cause label as well as the entity of interest label where degradation is being experienced e.g., in the example case it will set cause label to $a_2$ [CIO] and entity of interest level to $a_1$[BS1]. Next the whole deployment region of the simulated network is divided in n×n number of bins as shown in FIG. 5, where a 5×5 binning of a simulated region of a network is shown.

The training data pre-processor module 307 will generate three matrices $DS0_s$, $DS1_s$, $DS2_s$ each of size n×n e.g., $DS0_s$ as show in Table II:

TABLE II

| | | | | |
|---|---|---|---|---|
| 0 | 0 | 0 | 0 | 0 |
| 0 | 1 | 0 | 0 | 1 |
| 0 | 0 | 0 | 1 | 0 |
| 0 | 1 | 0 | 0 | 0 |
| 0 | 0 | 0 | 0 | 0 |

wherein 1 denote presence of base station in a particular bin and 0 as absence. $DS1_s$ as shown in Table III:

TABLE III

| | | | | |
|---|---|---|---|---|
| 5 | 2 | 10 | 0 | 1 |
| 3 | 1 | 1 | 2 | 2 |
| 1 | 4 | 6 | 1 | 10 |
| 4 | 1 | 2 | 2 | 11 |
| 5 | 13 | 5 | 5 | 5 |

where the number of a bin corresponds to the traffic generated/required in that bin (in this case number of UEs residing in a bin).

$DS2_s$ is shown in Table IV:

TABLE IV

| | | | | |
|---|---|---|---|---|
| 1 | 1 | 2 | 2 | 4 |
| 1 | 1 | 2 | 2 | 1 |
| 1 | 1 | 2 | 1 | 1 |
| 3 | 3 | 2 | 1 | 1 |
| 3 | 3 | 2 | 2 | 1 |

where the number of a bin corresponds to the clutter class of a bin e.g., open land, green vegetation, tall building, or similar class.

The cell measurements vector $O_s$ is augmented with cause label and entity of Interest label i.e., see Table V.

TABLE V

| Cell1_M1 | Cell1_M2 | . . . | Cell1_Mj | Cell2_M1 | . . . | Celli_Mj . . . | Cause Label | Entity of Interest Label |
|---|---|---|---|---|---|---|---|---|
| 0.8 | 0.5 | . . . | 0.3 | 0.5 | . . . | 0.7 | CIO | BS1 |

Based on the training data set generated from the simulator, the diagnosis student ML model is trained on that simulated dataset (e.g., with $DS0_s$, $DS1_s$, $DS2_s$ and measurement vector $O_s$) as input features as well as cause label, entity of interest as output label (Step 6). The pre-processed training data (e.g., three matrices and measurement vector together) form one sample of the training dataset. In one example embodiment, the convolutional neural network (CNN) of the diagnosis student model takes as input the three matrices while a fully connected network (FC) of the diagnosis student model takes the measurement vector as input. Once trained, it is validated on a real network dataset 309 (e.g., generated from historical faults logs) which will also comprise of $DS0_r$, $DS1_r$, $DS2_r$, real measurement vector $O_r$ as input features and corresponding cause and entity of interest as prediction labels.

Figure 6:
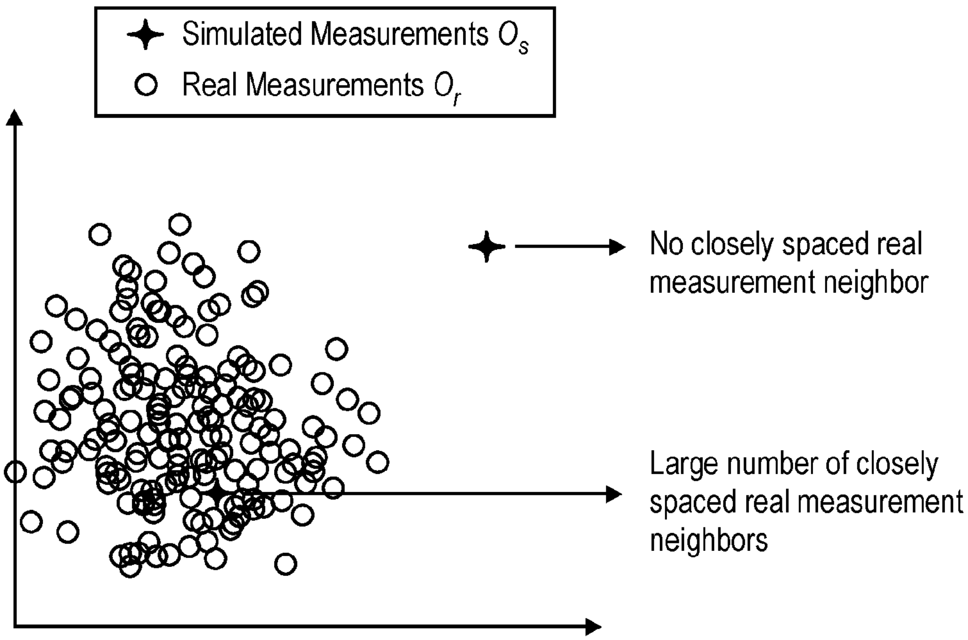
FIG. 6 is a diagram of a two-dimensional representation of reduced embedded space showing closeness of simulated measurements and real measurements.

The training manager 203 can include a similarity checker 311. The similarity checker 311 calculates a measurement between the simulated O and real network measurements $O_r$ (e.g., density of real measurement neighbors of a simulated measurement is calculated as shown in FIG. 6), and this value is then sent to the reward calculation module 313. The similarity check is utilized to ensure that simulated measurements generated by the network simulation are similar to or representative of real world measurements. The similarity measurement of FIG. 6 shows a two-dimensional reduced embedded space showing closeness of simulated measurements and real measurements.

A reward value is calculated by a reward calculator 313 (step 8) based on at least two factors, one factor is the normalized validation performance (P) of the diagnosis student model 207 on the real dataset 309. The normalized validation performance indicates how good the current diagnosis student model 207 is, e.g., measured by the evaluation measure on real network validation set. Another factor can be a normalized difference between simulated measurements and real measurements (δ): $r_t=\lambda_p(P)-\lambda_\delta(\delta)$). Here the coefficients $\lambda_p$ and $\lambda_\delta$ can provide trade-off between the diagnosis model performance and the data similarity between simulated and real measurements.

State can be generated from the diagnosis student model 207 that is dependent upon the nature of simulated measurements generated as well as the current state of the diagnosis student model as it is trained at this point in the process. The state vector is updated to $s_{t+1}$ depending upon (i) simulated measurements ($O_s$) statistical features (e.g., fitting parametric probability distribution on the $O_s$ and using parameters of the fitted distribution as the statistical features, bin-values of histograms of $O_s$ features etc.) and (ii) diagnosis student model 207 performance features reflecting how well the current diagnosis model is trained e.g., the averaged training loss over past iterations; the best validation loss so far, and similar characterizations. This state vector can be represented as $s_{t+1}=[Of_1, Of_2, \ldots, Of_n, Mf_1, Mf_2, \ldots, Mf_m]_t$, where we have n simulated measurements statistical features ($Of_n$) and m student model performance features ($Mf_m$).

In some embodiments, for improved training, the state, in addition to the KPIs and model performance related measures, can incorporate the current configuration of the network parameters, current iteration of the training manager process, generated fault label in an iteration as well as the predicted probabilities of fault labels. In this embodiment, state size is expanded so encoded low-dimensional embedding of the state representation can be utilized like in student model where output of CNN is used instead of the three matrices (DS0, DS1, DS2). It is possible to put as much information as possible into the state design to measure the training progress. However, a constant to represent the state may also be used so that such simple setting may allow the trainer to learn a good action quickly.

Based on the reward received $r_t$ and updated state $s_{t+1}$, the teacher model 205 takes action $a_{t+1}$. The interaction process stops when the student model gets converged (when the ML diagnosis student model 207 performance reaches some desired threshold), forming one episode of the teacher model 205 training. The trained teacher model 205 can then be utilized to train another diagnosis student model in another deployment scenario.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Thus, the embodiments provide a training manager that automates training of ML-based diagnosis models without requiring human assistance. The embodiments encompass similarity checks step to ensure quality of synthetic data generated. The embodiments also include deployment settings and measurements (KPIs/counters) as mixed input for diagnosis student models. The embodiments provide an ability to prioritize ML diagnosis student model performance and similarity between simulated and real measurements.

Figure 4:
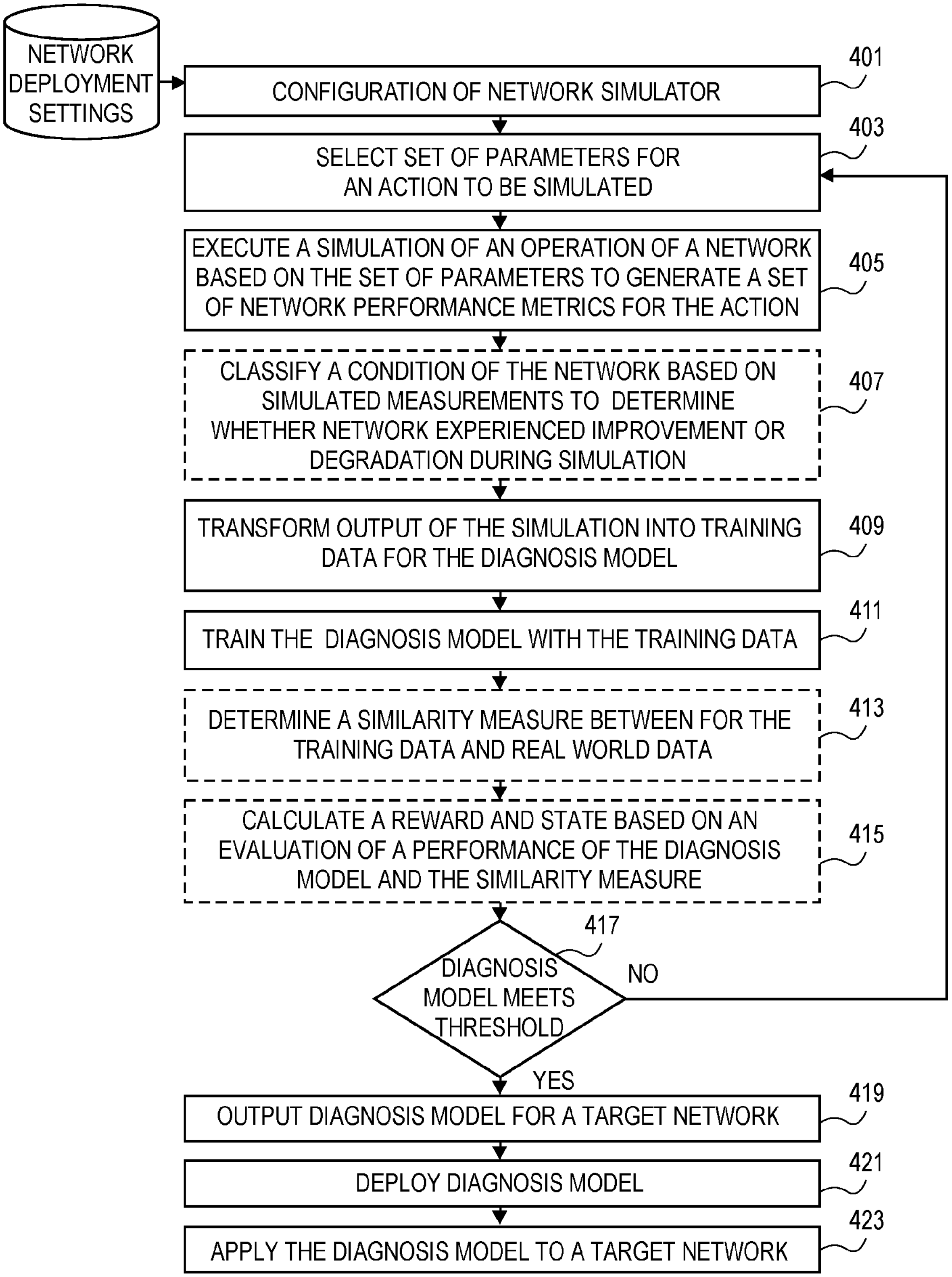
FIG. 4 is a diagram of one embodiment of a process of a training manager for mobile networks.

FIG. 4 is a diagram of one embodiment of a process of a training manager for mobile networks. In one embodiment, the process of the training manager can import or receive network deployment settings for a target network to be simulated and to establish a 'digital twin' of the target network by configuration of the network simulator to replicate the target network (Block 401). A teacher model or similar aspect of the training manager selects a set of parameters for an action to be simulated (Block 403). As described above, in some embodiments, the action can be a set of related parameters (e.g., at $=[a_1, a_2, a_3, a_4]_t$) that are to be tested in the simulation to determine whether these parameters improve or degrade the operation of the target network. The network simulator receives the set of parameters and executes a simulation of the operation of the network based on the set of parameters and other aspects such as the input network deployment settings to generate an output set of network performance metrics and settings (Block 405). The output of the network simulation can be a snapshot or similar capture of the simulated network settings and performance metrics after a designated number or amount of time for executing the simulation. The output of the network simulator can be processed by a network condition classifier and a training data pre-processor.

The network condition classifier can classify the output to identify a condition of the simulated network after the completion of the simulation (Block 407). The classification can utilize any subset of the output data from the simulation as a basis for identifying degradation or improvement of the operation of the network. The training data pre-processor transforms the simulator output for use in training a diagnosis student model (Block 409). The training data is applied to the diagnosis student model to train the diagnosis student model (Block 411). The real-world data is also applied to the diagnosis student model for comparison. A similarity measurement is also generated by a similarity checker to determine similarity between the training data and the real world data (Block 413). Determining the similarity provides a check on the training data being generated by the simulation to prevent too great a deviation from realistic network conditions.

The trained diagnosis student model provides updated state information that can be compared to how the diagnosis student model would diagnose historical network failures and conditions, which can be utilized to generate state and reward information (Block 415). The state and reward information can be analyzed to determine if the quality of the diagnosis student model has reached a designated threshold (Block 417), which indicates that the training can be ended. If the diagnosis student model has not met the threshold, then the teacher model can utilize the state and reward input to select a new set of parameters for an action to be tested (Block 403). If the diagnosis student model has met the threshold, then the process can end the training and output (Block 419) the diagnosis student model for the target network. The output diagnosis model can then be deployed (Block 421) to manage the operation of that target network (Block 423). The trained diagnosis student model can improve the operation of the target network by providing an automated mechanism for detecting network degradation based on certain underlying causes and to automatically adjust the operation of the target network to mitigate or solve the underlying cause of the network degradation. In addition, the teacher model improves as reward information is provided on each simulated action, which enables the teacher model to incorporate improved strategy, sequencing, policy, or similar aspects based on the reward feedback, which can enable the teacher model to more efficiently train other diagnosis models.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 7A:
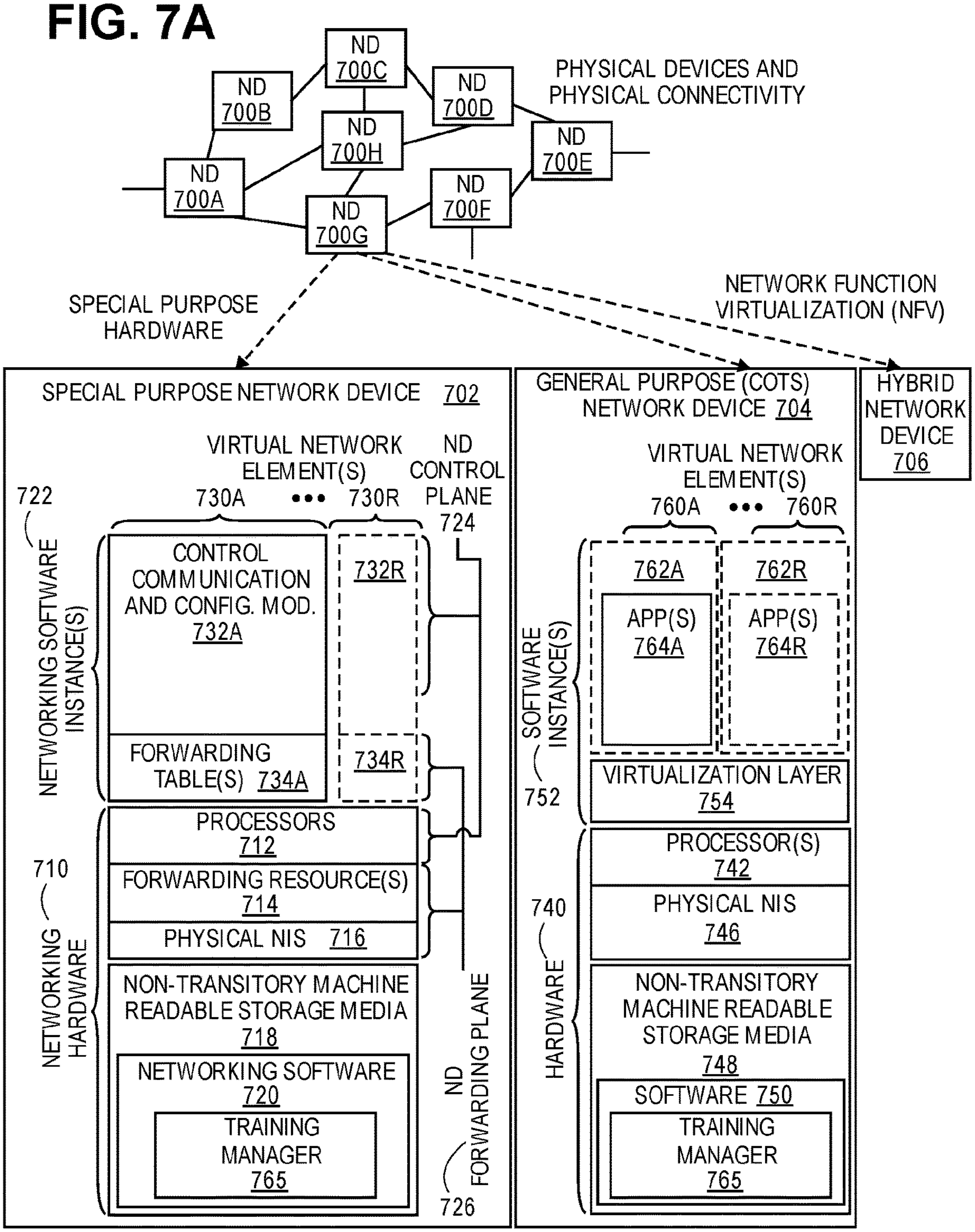
FIG. 7A illustrates connectivity between network devices (NDs) within an exemplary network, as well as three exemplary implementations of the NDs, according to some embodiments of the invention.

FIG. 7A illustrates connectivity between network devices (NDs) within an exemplary network, as well as three exemplary implementations of the NDs, according to some embodiments of the invention. FIG. 7A shows NDs 700A-H, and their connectivity by way of lines between 700A-700B, 700B-700C, 700C-700D, 700D-700E, 700E-700F, 700F-700G, and 700A-700G, as well as between 700H and each of 700A, 700C, 700D, and 700G. These NDs are physical devices, and the connectivity between these NDs can be wireless or wired (often referred to as a link). An additional line extending from NDs 700A, 700E, and 700F illustrates that these NDs act as ingress and egress points for the network (and thus, these NDs are sometimes referred to as edge NDs; while the other NDs may be called core NDs).

Two of the exemplary ND implementations in FIG. 7A are: 1) a special-purpose network device 702 that uses custom application-specific integrated-circuits (ASICs) and a special-purpose operating system (OS); and 2) a general purpose network device 704 that uses common off-the-shelf (COTS) processors and a standard OS.

The special-purpose network device 702 includes networking hardware 710 comprising a set of one or more processor(s) 712, forwarding resource(s) 714 (which typically include one or more ASICs and/or network processors), and physical network interfaces (NIs) 716 (through which network connections are made, such as those shown by the connectivity between NDs 700A-H), as well as non-transitory machine readable storage media 718 having stored therein networking software 720. During operation, the networking software 720 may be executed by the networking hardware 710 to instantiate a set of one or more networking software instance(s) 722. Each of the networking software instance(s) 722, and that part of the networking hardware 710 that executes that network software instance (be it hardware dedicated to that networking software instance and/or time slices of hardware temporally shared by that networking software instance with others of the networking software instance(s) 722), form a separate virtual network element 730A-R. Each of the virtual network element(s) (VNEs) 730A-R includes a control communication and configuration module 732A-R (sometimes referred to as a local control module or control communication module) and forwarding table(s) 734A-R, such that a given virtual network element (e.g., 730A) includes the control communication and configuration module (e.g., 732A), a set of one or more forwarding table(s) (e.g., 734A), and that portion of the networking hardware 710 that executes the virtual network element (e.g., 730A).

The special-purpose network device 702 is often physically and/or logically considered to include: 1) a ND control plane 724 (sometimes referred to as a control plane) comprising the processor(s) 712 that execute the control communication and configuration module(s) 732A-R; and 2) a ND forwarding plane 726 (sometimes referred to as a forwarding plane, a data plane, or a media plane) comprising the forwarding resource(s) 714 that utilize the forwarding table(s) 734A-R and the physical NIs 716. By way of example, where the ND is a router (or is implementing routing functionality), the ND control plane 724 (the processor(s) 712 executing the control communication and configuration module(s) 732A-R) is typically responsible for participating in controlling how data (e.g., packets) is to be routed (e.g., the next hop for the data and the outgoing physical NI for that data) and storing that routing information in the forwarding table(s) 734A-R, and the ND forwarding plane 726 is responsible for receiving that data on the physical NIs 716 and forwarding that data out the appropriate ones of the physical NIs 716 based on the forwarding table(s) 734A-R.

Figure 7B:
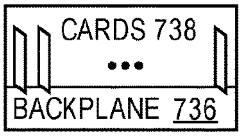
FIG. 7B illustrates an exemplary way to implement a special-purpose network device according to some embodiments of the invention.

FIG. 7B illustrates an exemplary way to implement the special-purpose network device 702 according to some embodiments of the invention. FIG. 7B shows a special-purpose network device including cards 738 (typically hot pluggable). While in some embodiments the cards 738 are of two types (one or more that operate as the ND forwarding plane 726 (sometimes called line cards), and one or more that operate to implement the ND control plane 724 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 736 (e.g., a first full mesh coupling the line cards and a second full mesh coupling all of the cards).

Returning to FIG. 7A, the general purpose network device 704 includes hardware 740 comprising a set of one or more processor(s) 742 (which are often COTS processors) and physical NIs 746, as well as non-transitory machine readable storage media 748 having stored therein software 750. During operation, the processor(s) 742 execute the software 750 to instantiate one or more sets of one or more applications 764A-R. While one embodiment does not implement virtualization, alternative embodiments may use different forms of virtualization. For example, in one such alternative embodiment the virtualization layer 754 represents the kernel of an operating system (or a shim executing on a base operating system) that allows for the creation of multiple instances 762A-R called software containers that may each be used to execute one (or more) of the sets of applications 764A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 754 represents a hypervisor (sometimes referred to as a virtual machine monitor (VMM)) or a hypervisor executing on top of a host operating system, and each of the sets of applications 764A-R is run on top of a guest operating system within an instance 762A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 740, directly on a hypervisor (in which case the unikernel is sometimes described as running within a LibOS virtual machine), or in a software container, embodiments can be implemented fully with unikernels running directly on a hypervisor represented by virtualization layer 754, unikernels running within software containers represented by instances 762A-R, or as a combination of unikernels and the above-described techniques (e.g., unikernels and virtual machines both run directly on a hypervisor, unikernels and sets of applications that are run in different software containers).

The instantiation of the one or more sets of one or more applications 764A-R, as well as virtualization if implemented, are collectively referred to as software instance(s) 752. Each set of applications 764A-R, corresponding virtualization construct (e.g., instance 762A-R) if implemented, and that part of the hardware 740 that executes them (be it hardware dedicated to that execution and/or time slices of hardware temporally shared), forms a separate virtual network element(s) 760A-R.

The virtual network element(s) 760A-R perform similar functionality to the virtual network element(s) 730A-R—e.g., similar to the control communication and configuration module(s) 732A and forwarding table(s) 734A (this virtualization of the hardware 740 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 762A-R corresponding to one VNE 760A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 762A-R to VNEs also apply to embodiments where such a finer level of granularity and/or unikernels are used.

In certain embodiments, the virtualization layer 754 includes a virtual switch that provides similar forwarding services as a physical Ethernet switch. Specifically, this virtual switch forwards traffic between instances 762A-R and the physical NI(s) 746, as well as optionally between the instances 762A-R; in addition, this virtual switch may enforce network isolation between the VNEs 760A-R that by policy are not permitted to communicate with each other (e.g., by honoring virtual local area networks (VLANs)).

The third exemplary ND implementation in FIG. 7A is a hybrid network device 706, which includes both custom ASICs/special-purpose $O_S$ and COTS processors/standard $O_S$ in a single ND or a single card within an ND. In certain embodiments of such a hybrid network device, a platform VM (i.e., a VM that that implements the functionality of the special-purpose network device 702) could provide for para-virtualization to the networking hardware present in the hybrid network device 706.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also, in all of the above exemplary implementations, each of the VNEs (e.g., VNE(s) 730A-R, VNEs 760A-R, and those in the hybrid network device 706) receives data on the physical NIs (e.g., 716, 746) and forwards that data out the appropriate ones of the physical NIs (e.g., 716, 746). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 7C:
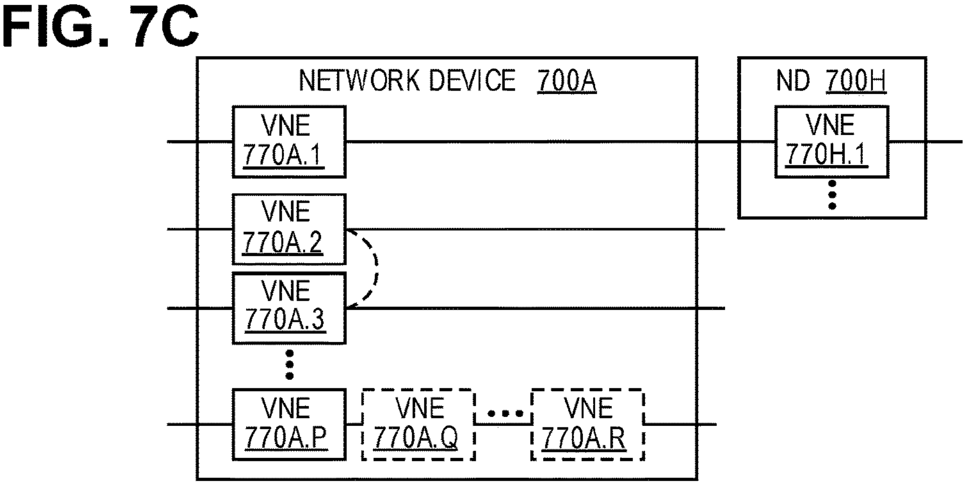
FIG. 7C illustrates various exemplary ways in which virtual network elements (VNEs) may be coupled according to some embodiments of the invention.

FIG. 7C illustrates various exemplary ways in which VNEs may be coupled according to some embodiments of the invention. FIG. 7C shows VNEs 770A.1-770A.P (and optionally VNEs 770A.Q-770A.R) implemented in ND 700A and VNE 770H.1 in ND 700H. In FIG. 7C, VNEs 770A.1-P are separate from each other in the sense that they can receive packets from outside ND 700A and forward packets outside of ND 700A; VNE 770A.1 is coupled with VNE 770H.1, and thus they communicate packets between their respective NDs; VNE 770A.2-770A.3 may optionally forward packets between themselves without forwarding them outside of the ND 700A; and VNE 770A.P may optionally be the first in a chain of VNEs that includes VNE 770A.Q followed by VNE 770A.R (this is sometimes referred to as dynamic service chaining, where each of the VNEs in the series of VNEs provides a different service—e.g., one or more layer 4-7 network services). While FIG. 7C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 7A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 7A may also host one or more such servers (e.g., in the case of the general purpose network device 704, one or more of the software instances 762A-R may operate as servers; the same would be true for the hybrid network device 706; in the case of the special-purpose network device 702, one or more such servers could also be run on a virtualization layer executed by the processor(s) 712); in which case the servers are said to be co-located with the VNEs of that ND.

A virtual network is a logical abstraction of a physical network (such as that in FIG. 7A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPsec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 7D:
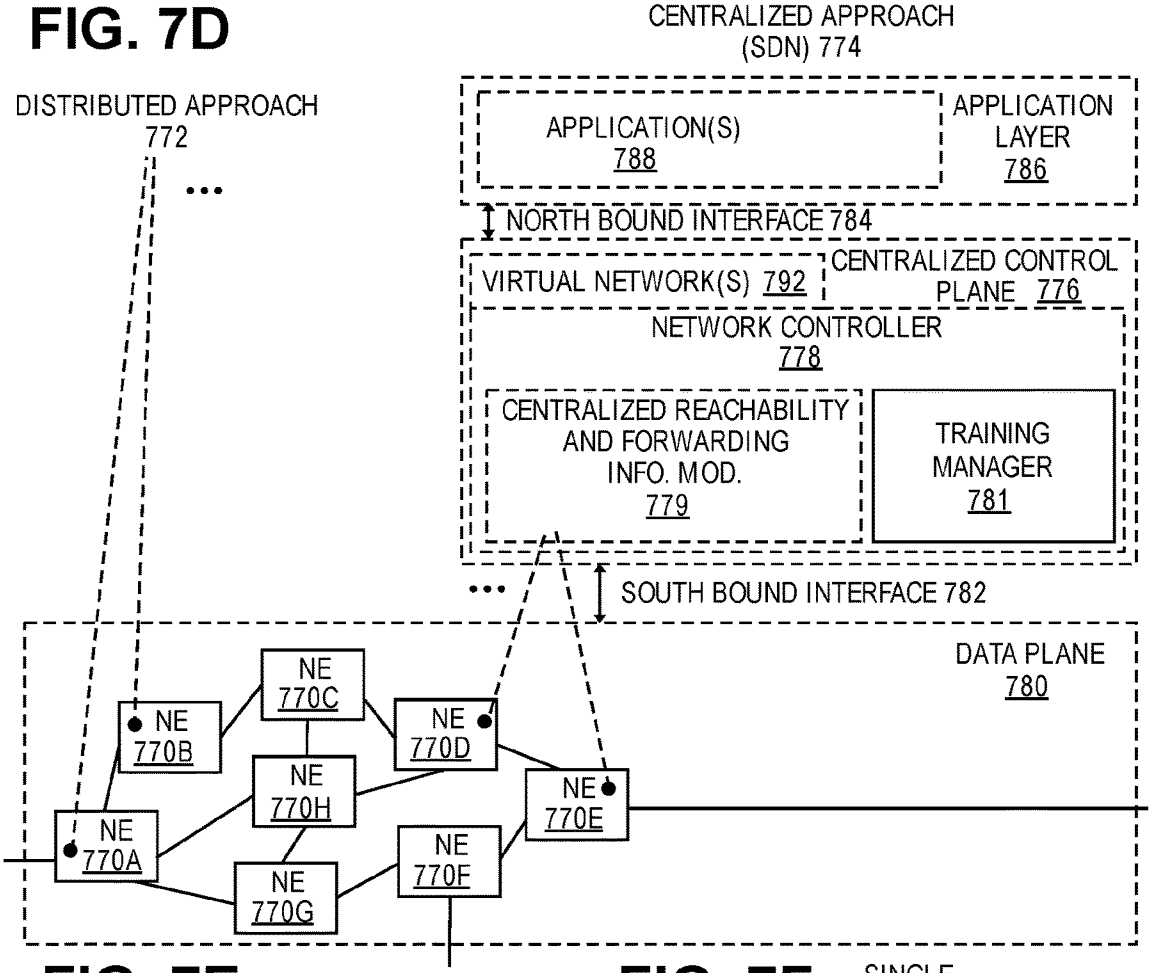
FIG. 7D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 7D illustrates a network with a single network element on each of the NDs of FIG. 7A, and within this straightforward approach contrasts a traditional distributed approach (commonly used by traditional routers) with a centralized approach for maintaining reachability and forwarding information (also called network control), according to some embodiments of the invention. Specifically, FIG. 7D illustrates network elements (NEs) 770A-H with the same connectivity as the NDs 700A-H of FIG. 7A.

FIG. 7D illustrates that the distributed approach 772 distributes responsibility for generating the reachability and forwarding information across the NEs 770A-H; in other words, the process of neighbor discovery and topology discovery is distributed.

For example, where the special-purpose network device 702 is used, the control communication and configuration module(s) 732A-R of the ND control plane 724 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 770A-H (e.g., the processor(s) 712 executing the control communication and configuration module(s) 732A-R) perform their responsibility for participating in controlling how data (e.g., packets) is to be routed (e.g., the next hop for the data and the outgoing physical NI for that data) by determining the reachability within the network and calculating their respective forwarding information in a distributed way. Routes and adjacencies are stored in one or more routing structures (e.g., Routing Information Base (RIB), Label Information Base (LIB), one or more adjacency structures) on the ND control plane 724. The ND control plane 724 programs the ND forwarding plane 726 with information (e.g., adjacency and route information) based on the routing structure(s). For example, the ND control plane 724 programs the adjacency and route information into one or more forwarding table(s) 734A-R (e.g., Forwarding Information Base (FIB), Label Forwarding Information Base (LFIB), and one or more adjacency structures) on the ND forwarding plane 726. For layer 2 forwarding, the ND can store one or more bridging tables that are used to forward data based on the layer 2 information in that data. While the above example uses the special-purpose network device 702, the same distributed approach772 can be implemented on the general purpose network device 704 and the hybrid network device 706.

FIG. 7D illustrates that a centralized approach 774 (also known as software defined networking (SDN)) that decouples the system that makes decisions about where traffic is sent from the underlying systems that forwards traffic to the selected destination. The illustrated centralized approach 774 has the responsibility for the generation of reachability and forwarding information in a centralized control plane 776 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 776 has a south bound interface 782 with a data plane 780 (sometime referred to the infrastructure layer, network forwarding plane, or forwarding plane (which should not be confused with a ND forwarding plane)) that includes the NEs 770A-H (sometimes referred to as switches, forwarding elements, data plane elements, or nodes). The centralized control plane 776 includes a network controller 778, which includes a centralized reachability and forwarding information module 779 that determines the reachability within the network and distributes the forwarding information to the NEs 770A-H of the data plane 780 over the south bound interface 782 (which may use the OpenFlow protocol). Thus, the network intelligence is centralized in the centralized control plane 776 executing on electronic devices that are typically separate from the NDs.

For example, where the special-purpose network device 702 is used in the data plane 780, each of the control communication and configuration module(s) 732A-R of the ND control plane 724 typically include a control agent that provides the VNE side of the south bound interface 782. In this case, the ND control plane 724 (the processor(s) 712 executing the control communication and configuration module(s) 732A-R) performs its responsibility for participating in controlling how data (e.g., packets) is to be routed (e.g., the next hop for the data and the outgoing physical NI for that data) through the control agent communicating with the centralized control plane 776 to receive the forwarding information (and in some cases, the reachability information) from the centralized reachability and forwarding information module 779 (it should be understood that in some embodiments of the invention, the control communication and configuration module(s) 732A-R, in addition to communicating with the centralized control plane 776, may also play some role in determining reachability and/or calculating forwarding information—albeit less so than in the case of a distributed approach; such embodiments are generally considered to fall under the centralized approach 774, but may also be considered a hybrid approach).

While the above example uses the special-purpose network device 702, the same centralized approach 774 can be implemented with the general purpose network device 704 (e.g., each of the VNE 760A-R performs its responsibility for controlling how data (e.g., packets) is to be routed (e.g., the next hop for the data and the outgoing physical NI for that data) by communicating with the centralized control plane 776 to receive the forwarding information (and in some cases, the reachability information) from the centralized reachability and forwarding information module 779; it should be understood that in some embodiments of the invention, the VNEs 760A-R, in addition to communicating with the centralized control plane 776, may also play some role in determining reachability and/or calculating forwarding information—albeit less so than in the case of a distributed approach) and the hybrid network device 706. In fact, the use of SDN techniques can enhance the NFV techniques typically used in the general purpose network device 704 or hybrid network device 706 implementations as NFV is able to support SDN by providing an infrastructure upon which the SDN software can be run, and NFV and SDN both aim to make use of commodity server hardware and physical switches.

FIG. 7D also shows that the centralized control plane 776 has a north bound interface 784 to an application layer 786, in which resides application(s) 788. The centralized control plane 776 has the ability to form virtual networks 792 (sometimes referred to as a logical forwarding plane, network services, or overlay networks (with the NEs 770A-H of the data plane 780 being the underlay network)) for the application(s) 788. Thus, the centralized control plane 776 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 7D shows the distributed approach 772 separate from the centralized approach 774, the effort of network control may be distributed differently or the two combined in certain embodiments of the invention. For example: 1) embodiments may generally use the centralized approach (SDN) 774, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 774 but may also be considered a hybrid approach.

While FIG. 7D illustrates the simple case where each of the NDs 700A-H implements a single NE 770A-H, it should be understood that the network control approaches described with reference to FIG. 7D also work for networks where one or more of the NDs 700A-H implement multiple VNEs (e.g., VNEs 730A-R, VNEs 760A-R, those in the hybrid network device 706). Alternatively, or in addition, the network controller 778 may also emulate the implementation of multiple VNEs in a single ND. Specifically, instead of (or in addition to) implementing multiple VNEs in a single ND, the network controller 778 may present the implementation of a VNE/NE in a single ND as multiple VNEs in the virtual networks 792 (all in the same one of the virtual networks(s) 792, each in different ones of the virtual network(s) 792, or some combination). For example, the network controller 778 may cause an ND to implement a single VNE (a NE) in the underlay network, and then logically divide up the resources of that NE within the centralized control plane 776 to present different VNEs in the virtual network(s) 792 (where these different VNEs in the overlay networks are sharing the resources of the single VNE/NE implementation on the ND in the underlay network).

Figure 7E:
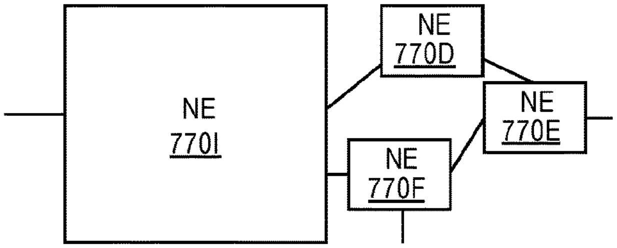
FIG. 7E illustrates the simple case of where each of the NDs implements a single NE, but a centralized control plane has abstracted multiple of the NEs in different NDs into (to represent) a single NE in one of the virtual network(s), according to some embodiments of the invention.
Figure 7F:
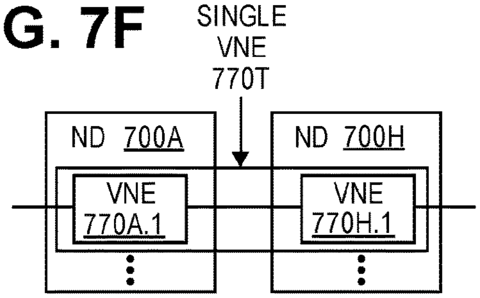
FIG. 7F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 7E and 7F respectively illustrate exemplary abstractions of NEs and VNEs that the network controller 778 may present as part of different ones of the virtual networks 792. FIG. 7E illustrates the simple case of where each of the NDs 700A-H implements a single NE 770A-H (see FIG. 7D), but the centralized control plane 776 has abstracted multiple of the NEs in different NDs (the NEs 770A-C and G-H) into (to represent) a single NE 7701 in one of the virtual network(s) 792 of FIG. 7D, according to some embodiments of the invention. FIG. 7E shows that in this virtual network, the NE 7701 is coupled to NE 770D and 770F, which are both still coupled to NE 770E.

FIG. 7F illustrates a case where multiple VNEs (VNE 770A.1 and VNE 770H.1) are implemented on different NDs (ND 700A and ND 700H) and are coupled to each other, and where the centralized control plane 776 has abstracted these multiple VNEs such that they appear as a single VNE 770T within one of the virtual networks 792 of FIG. 7D, according to some embodiments of the invention. Thus, the abstraction of a NE or VNE can span multiple NDs.

While some embodiments of the invention implement the centralized control plane 776 as a single entity (e.g., a single instance of software running on a single electronic device), alternative embodiments may spread the functionality across multiple entities for redundancy and/or scalability purposes (e.g., multiple instances of software running on different electronic devices).

Figure 8:
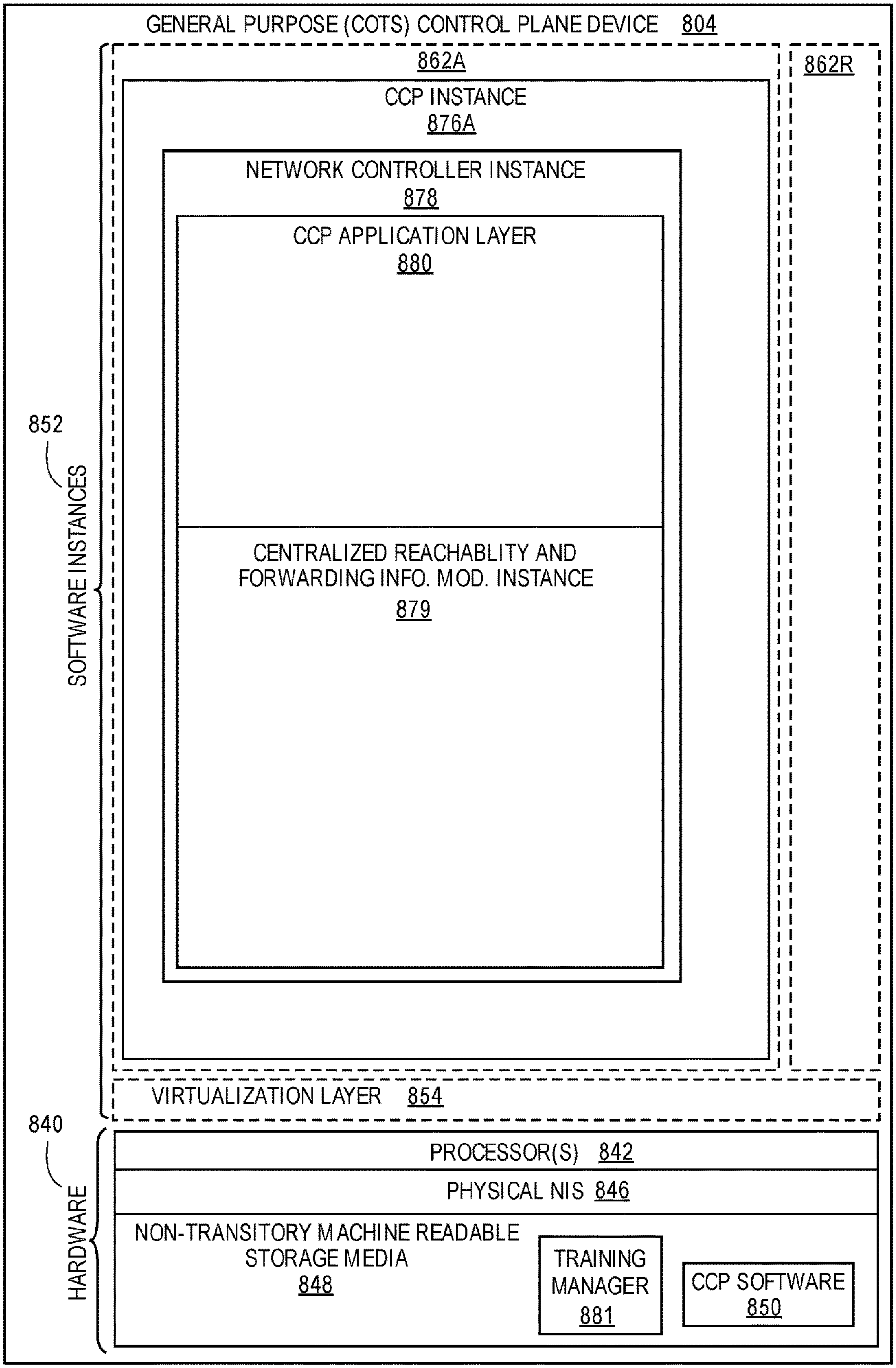
FIG. 8 illustrates a general purpose control plane device with centralized control plane (CCP) software 850), according to some embodiments of the invention.

Similar to the network device implementations, the electronic device(s) running the centralized control plane 776, and thus the network controller 778 including the centralized reachability and forwarding information module 779, may be implemented a variety of ways (e.g., a special purpose device, a general-purpose (e.g., COTS) device, or hybrid device). These electronic device(s) would similarly include processor(s), a set of one or more physical NIs, and a non-transitory machine-readable storage medium having stored thereon the centralized control plane software. For instance, FIG. 8 illustrates, a general purpose control plane device 804 including hardware 840 comprising a set of one or more processor(s) 842 (which are often COTS processors) and physical NIs 846, as well as non-transitory machine readable storage media 848 having stored therein centralized control plane (CCP) software 850.

In embodiments that use compute virtualization, the processor(s) 842 typically execute software to instantiate a virtualization layer 854 (e.g., in one embodiment the virtualization layer 854 represents the kernel of an operating system (or a shim executing on a base operating system) that allows for the creation of multiple instances 862A-R called software containers (representing separate user spaces and also called virtualization engines, virtual private servers, or jails) that may each be used to execute a set of one or more applications; in another embodiment the virtualization layer 854 represents a hypervisor (sometimes referred to as a virtual machine monitor (VMM)) or a hypervisor executing on top of a host operating system, and an application is run on top of a guest operating system within an instance 862A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular $O_s$ services needed by the application, and the unikernel can run directly on hardware 840, directly on a hypervisor represented by virtualization layer 854 (in which case the unikernel is sometimes described as running within a LibOS virtual machine), or in a software container represented by one of instances 862A-R). Again, in embodiments where compute virtualization is used, during operation an instance of the CCP software 850 (illustrated as CCP instance 876A) is executed (e.g., within the instance 862A) on the virtualization layer 854. In embodiments where compute virtualization is not used, the CCP instance 876A is executed, as a unikernel or on top of a host operating system, on the "bare metal" general purpose control plane device 804. The instantiation of the CCP instance 876A, as well as the virtualization layer 854 and instances 862A-R if implemented, are collectively referred to as software instance(s) 852.

In some embodiments, the CCP instance 876A includes a network controller instance 878. The network controller instance 878 includes a centralized reachability and forwarding information module instance 879 (which is a middleware layer providing the context of the network controller 778 to the operating system and communicating with the various NEs), and an CCP application layer 880 (sometimes referred to as an application layer) over the middleware layer (providing the intelligence required for various network operations such as protocols, network situational awareness, and user—interfaces). At a more abstract level, this CCP application layer 880 within the centralized control plane 776 works with virtual network view(s) (logical view(s) of the network) and the middleware layer provides the conversion from the virtual networks to the physical view.

The centralized control plane 776 transmits relevant messages to the data plane 780 based on CCP application layer 880 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 780 may receive different messages, and thus different forwarding information. The data plane 780 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 780, the packet (or a subset of the packet header and content) is typically forwarded to the centralized control plane 776. The centralized control plane 776 will then program forwarding table entries into the data plane 780 to accommodate packets belonging to the flow of the unknown packet. Once a specific forwarding table entry has been programmed into the data plane 780 by the centralized control plane 776, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multipath forwarding and IP multipath) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method of a training manager for generating diagnosis models for mobile networks, the method comprising:

selecting, automatically by the training manager, a set of parameters for an action to be simulated in a simulated network where the simulated network replicates a target network for a diagnosis model, the action being configured to induce a performance degradation in the simulated network;

executing a simulation of an operation of the simulated network based on the set of parameters of the action to generate an output of the simulation including a set of network performance metrics reflecting the performance degradation;

transforming the output of the simulation into training data for the diagnosis model, the training data identifying a root cause associated with the set of network performance metrics, the root cause being a configuration parameter of the set of parameters that was changed to induce the performance degradation;

training the diagnosis model with the training data to predict, from a set of network performance metrics, a root cause of a performance degradation in the target network; and outputting the diagnosis model for the target network, in response to the diagnosis model meeting a designated quality threshold.

2. The method of claim 1, further comprising:

classifying a condition of the simulated network after executing the simulation based on simulated measurements from the simulation.

3. The method of claim 2, wherein the classifying further comprises:

determining a state of a configuration parameter for an entity of interest in the set of parameters of the action.

4. The method of claim 1, further comprising:

determining a similarity measure between the training data and real world data; and calculating a reward for selecting a next action to be simulated based on an evaluation of a performance of the diagnosis model and the similarity measure.

5. The method of claim 4, wherein a teacher model of the training manager selects the next action to be simulated based on the reward.

6. The method of claim 4, wherein the similarity measure is determined as a density of real measurement neighbors of a simulated measurement from the simulation.

7. The method of claim 1, wherein the set of parameters includes a selection of a network component to change, a configuration parameter to change, degree of change to the configuration parameter, and a traffic profile to test.

8. The method of claim 1, wherein transforming the output into the training data further comprises:

organizing deployment settings of the simulated network into a first matrix indicating whether a location includes a base station, a second matrix indicating traffic level in the location, and a third matrix indicating a clutter class for the location.

9. The method of claim 1, further comprising:

applying the diagnosis model to the target network.

10. The method of claim 1, wherein a teacher model of the training manager is updated to select actions based on associated rewards and can be utilized for subsequent training of additional diagnosis models.

11. A non-transitory machine-readable medium comprising computer program code which when executed by a computer carries out a set of operations for a training manager for generating diagnosis models for mobile networks, the set of operations comprising:

selecting, automatically by the training manager, a set of parameters for an action to be simulated in a simulated network, where the simulated network replicates a target network for a diagnosis model, the action being configured to induce a performance degradation in the simulated network;

executing a simulation an operation of the simulated network based on the set of parameters of the action to generate an output of the simulation including a set of network performance metrics reflecting the performance degradation;

transforming the output of the simulation into training data for the diagnosis model, the training data identifying a root cause associated with the set of network performance metrics, the root cause being a configuration parameter of the set of parameters that was changed to induce the performance degradation;

training the diagnosis model with the training data to predict, from a set of network performance metrics, a root cause of a performance degradation in the target network; and outputting the diagnosis model for the target network, in response to the diagnosis model meeting a designated quality threshold.

12. A system of one or more electronic devices, comprising:

a non-transitory machine-readable storage medium having stored therein a training manager; and a processor coupled to the non-transitory machine-readable storage medium, the processor to execute the training manager, the training manager to select, automatically, a set of parameters for an action to be simulated in a simulated network where the simulated network replicates a target network for a diagnosis model, the action being configured to induce a performance degradation in the simulated network, execute a simulation of an operation of the simulated network based on the set of parameters of the action to generate an output of the simulation including a set of network performance metrics reflecting the performance degradation, transform the output of the simulation into training data for the diagnosis model, the training data identifying a root cause associated with the set of network performance metrics, the root cause being a configuration parameter of the set of parameters that was changed to induce the performance degradation, train the diagnosis model with the training data to predict, from a set of network performance metrics, a root cause of a performance degradation in the target network, and output the diagnosis model for the target network, in response to the diagnosis model meeting a designated quality threshold.

13. The non-transitory machine-readable medium of claim 11, further comprising computer program code which when executed by the computer carries out a set of operations for the training manager for generating diagnosis models for mobile networks, the set of operations further comprising:

classifying a condition of the simulated network after executing the simulation based on simulated measurements from the simulation.

14. The non-transitory machine-readable medium of claim 13, further comprising computer program code which when executed by the computer carries out a set of operations for the training manager for generating diagnosis models for mobile networks, the set of operations further comprising:

determining a state of a configuration parameter for an entity of interest in the set of parameters of the action.

15. The non-transitory machine-readable medium of claim 11, further comprising computer program code which when executed by the computer carries out a set of operations for the training manager for generating diagnosis models for mobile networks, the set of operations further comprising:

determining a similarity measure between the training data and real world data; and calculating a reward for selecting a next action to be simulated based on an evaluation of a performance of the diagnosis model and the similarity measure.

16. The non-transitory machine-readable medium of claim 11, wherein a teacher model of the training manager is updated to select actions based on associated rewards and can be utilized for subsequent training of additional diagnosis models.

17. The system of claim 12, wherein the training manager is further to classify a condition of the simulated network after executing the simulation based on simulated measurements from the simulation.

18. The system of claim 17, wherein the training manager is further to determine a state of a configuration parameter for an entity of interest in the set of parameters of the action.

19. The system of claim 12, wherein the training manager is further to determine a similarity measure between the training data and real world data, and calculate a reward for selecting a next action to be simulated based on an evaluation of a performance of the diagnosis model and the similarity measure.

20. The system of claim 12, wherein a teacher model of the training manager is updated to select actions based on associated rewards and can be utilized for subsequent training of additional diagnosis models.

* * * * *